HENRI E. BISSELL.

Improvement in Spring Bed Bottoms.

No. 4,564. Reissued Sep. 19, 1871.

Witnesses.
T. E. Steele
Edward Goodman

Inventor.
Henri E. Bissell
By W. E. Simonds
Atty
Hartford Conn.

THE ZOLLER LITHOGRAPHING CO. WASHINGTON, D. C.

UNITED STATES PATENT OFFICE.

HENRI E. BISSELL, OF HARTFORD, CONNECTICUT.

IMPROVEMENT IN SPRING-BED BOTTOMS.

Specification forming part of Letters Patent No. 94,701, dated September 14, 1869; reissue No. 4,564, dated September 19, 1871.

*To all whom it may concern:*

Be it known that I, HENRI E. BISSELL, of Hartford, in the county of Hartford and State of Connecticut, have invented a new and useful Improved Spring-Bed, of which the following is a specification, reference being had to the accompanying drawing, in which—

Figure 1:
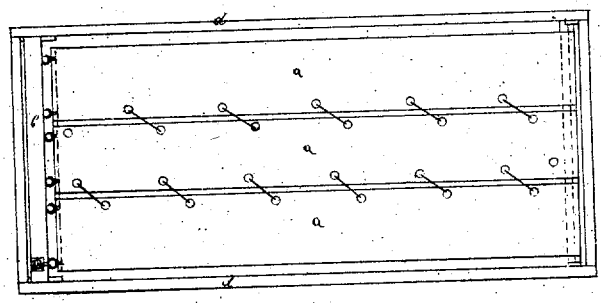
Figure 2:
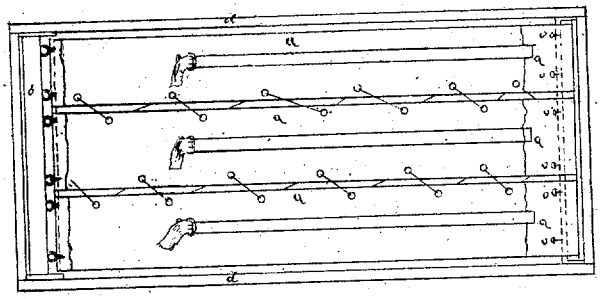
Figure 4:
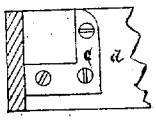
Figure 5:
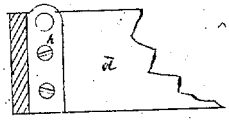
Figure 6:
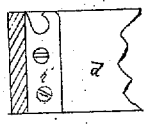
Figure 3:
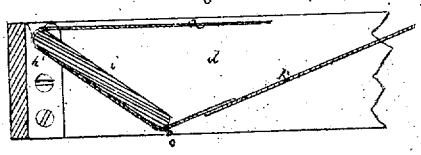

Figure 1 is a top or plan view of my invention. Fig. 2 is a view of the under side of the bed. Fig. 3 is a sectional view of the tightening apparatus situated at the foot of the bed. Fig. 4 is a detached view of one of the sockets for the ends of what is known herein as the "head piece." Fig. 5 is a detached view of the bearing for one of the ends of the "foot piece." Fig. 6 is a detached view of the bearing for the other of the ends of the foot piece.

*a a a* designate the sections of which the bed is composed, which sections are made of stout canvas, or of some equivalent therefor. This division of the canvas into sections is a most important feature of this invention. When the canvas is all in one piece then, if a heavier weight is put upon one point than upon the other parts of the bed, that point will be the lowest and the canvas will slope downward toward it from all directions. If two persons occupy a canvas-bed whose canvas is all in one piece, one of which persons is heavier than the other, then the heavier person will press his side down the lowest and the lighter person will tend all the while to roll down against his heavier companion. These and other objections to a whole canvas are completely overcome by dividing the canvas into sections. Each section has its separate points of suspension at its ends, and will maintain its own elevation and position without much reference to the position of its fellow-section. It is, however, necessary that the sections should be laced somewhat loosely together at their edges by cords running through eyelet-holes, as is represented in the drawing, so that when the weight of a person happens to come directly over the parting between the sections the sections shall not recede sidewise from each other and thus cease to properly support the person. At the head of the bed is a stout bar of wood, *b*, called a head piece herein, each end of which fits down into a socket, *c*, shown in Fig. 4, which sockets are fixed to the insides of the two side pieces *d d* of the bed-frame. These sockets can be just as well made into the side pieces, but I think a metal socket screwed to the side is preferable. It will be readily understood that the head piece *b* is removable at pleasure from the sockets. The sections *a* are attached to the head piece *b*, each by means of two short bars of metal made into a ring at one end, which is stoutly fastened to one end of the section. Each of these bars runs into the head piece and through a spiral spring or its equivalent, and is attached to the free end of the spring, which spring is contained in a proper socket in the head piece, the other end of the spring resting on and against the bottom of the socket, causing the spring to exert its action by compression. This arrangement, so far as concerns one of the springs, is represented at *e*. At the foot of the bed the sections run over the foot piece *i* down under the bed. This foot piece is a sort of a cam or eccentric, the journals of which rest in the bearings *h* and *h'*, and from the shape of the bearing *h'* it will be readily understood that the foot-piece is removable at pleasure. These bearings *h* and *h'* are screwed to the insides of the side pieces *d d*. The sections come to an end shortly after passing around the cam *i*. To these ends are attached the strainers *k k k*, which are buckled at their other end to the bottoms of the sections, and by means of these strainers any desired tension can be given to the sections. It is desirable to tack the sections to the bottom of the cam *i*, as by tacks *o*, shown, and then when the strainers are buckled tighter the action of the cam will assist in straining the sections. A roller and ratchet may be substituted for the cam and strainers, but I think the cam preferable.

I claim as my invention—

1. A canvas stretcher for a bed made in sections laced together, substantially as described and for the purpose set forth.

2. The canvas stretcher for a bed made in sections *a*, laced together and attached to the head piece *b* by means of springs and bars, substantially as and for the purposes set forth.

H. E. BISSELL.

Witnesses:
WM. E. SIMONDS,
HUBERT C. HART.